June 10, 1941.  G. L. WILLIAMS  2,245,239
DYNAMIC VIBRATION DAMPER
Filed April 29, 1939
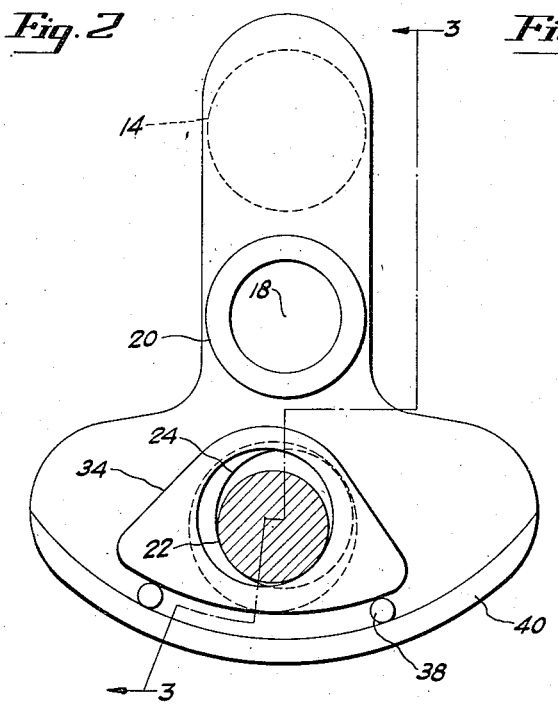
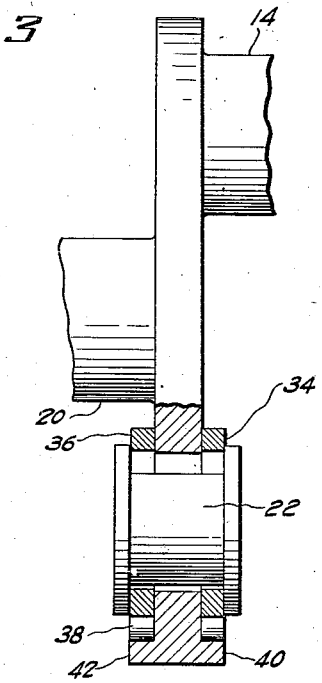
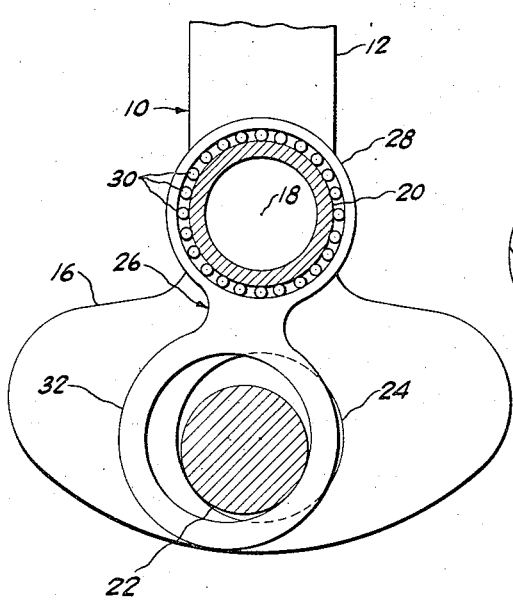
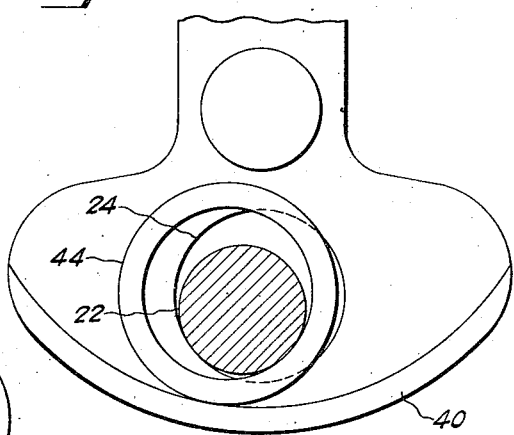
INVENTOR
George L. Williams
BY Harris G. Luther
ATTORNEY Patented June 10, 1941

2,245,239

UNITED STATES PATENT OFFICE 2,245,239

DYNAMIC VIBRATION DAMPER

George L. Williams, Manchester, Conn., assignor to United Aircraft Corporation, East Hartford, Conn., a corporation of Delaware Application April 29, 1939, Serial No. 270,879

12 Claims. (Cl. 74—604)

This invention relates to improvements in dynamic vibration dampers and has particular reference to an improved damper for suppressing vibrational impulses of low order.

An object of the invention resides in the provision of an improved low order vibration damper particularly adapted for incorporation in the structure of an internal combustion engine.

A further object resides in the provision of a relatively simple and light weight vibration damper which is effective to suppress vibrations of an order below two and one-half cycles per revolution.

A somewhat more specific object resides in the provision of an improved vibration damper for suppressing torsional vibration which includes means for exciting a relatively freely rotatable mass in a manner to counteract the vibrational impulses in a rotatable driving member.

Other objects and advantages will be more particularly pointed out hereinafter or will become apparent as the description proceeds.

In the accompanying drawing, in which like reference numerals are used to designate similar parts throughout, there is illustrated in three slightly different forms a suitable mechanical arrangement for disclosing the invention. The drawing, however, is for the purpose of illustration only and is not to be taken as limiting or restricting the scope of the invention as it will be apparent to those skilled in the art that the invention may be incorporated in various arrangements other than those particularly illustrated.

In the drawing, Fig. 1 is a vertical sectional view through a vibration damper constructed according to the invention, a portion of an engine counterweight being somewhat schematically shown in elevation.

Fig. 2 is an elevational view of a somewhat modified form of vibration damper constructed according to the invention.

Fig. 3 is a sectional view on the line 3—3 of Fig. 2, and

Fig. 4 is an elevational view of a still further modified form of vibration damper constructed according to the invention.

Referring to the drawing in detail, the numeral 10 generally indicates an engine crankshaft having a crank cheek 12 carrying a crankpin 14 at one end and a counterweight 16 at the other, the entire crankshaft including the crankpin and counterweight being rotatable about the shaft axis 18 on bearings one of which is indicated at 20.

As is well known, the crankshaft of an internal combustion engine is subject, during engine operation, to periodic torsional vibrations due to the timing of the power impulses and the geometry of the connecting rod system. The entire range of torsional crankshaft vibrations may be by analysis divided up into various orders in terms of cycles per crankshaft revolution. Thus, analysis of crankshaft torque of a radial engine has shown that there may be a primary or first order vibration impulse occurring once per each crankshaft revolution, such as might be caused by an unequal distribution of weight on opposite sides of the crankshaft axis, a secondary order of vibrational impulses occurring twice per revolution and various other orders increasing in the number of cycles per revolution until their amplitude becomes too small to measure. As long as the various orders of cyclic impulses are isolated in non-resonant vibration of the crankshaft they may cause no serious harm but, if at some particular engine speed in the operative range a particular order of cyclic impulses comes into resonance with the natural frequency of some object connected with the crankshaft, such as a propeller driven by the engine, the amplitude of the vibrational reaction between the crankshaft and the object may quickly assume a destructive amplitude. For this reason, and particularly in the case of aircraft engines driving aeronautical propellers, it has been found necessary to incorporate in the engine some means of suppressing particularly undesirable orders of cyclic torsional vibration in the crankshaft. One form of vibration damper used for this purpose comprises a loose cylindrical weight 22 of metal disposed in a circular cavity 24 in a crankshaft counterweight 16. The cavity has a diameter exceeding the diameter of the weight, commonly referred to as a puck, by a predetermined amount depending upon the particular order of cyclic vibrations which it is intended to suppress. In practical engine construction such dampers have been found effective for vibrations from about two and one-half upwardly, that is a damper can be practically designed to suppress any one order of cyclic vibrational impulses above the two and one-half order. At very low orders the diameter of the cavity becomes so much greater than the diameter of the puck, since the ratio of the diameters varies as a geometrical function of the order numbers, that either the cavity would become so large that it could not be contained in any practical available part of the crankshaft or the puck would become so small that it would have insufficient mass to accomplish any satisfactory vibration damping effect. In order to suppress low order cyclic vibrations, such as those below the two and one-half order, it becomes necessary to adopt a different principle of operation. It has been found that this purpose can be accomplished by connecting a driven member in the nature of a flywheel rotatable about a fixed axis through a centrifugal coupling to a driving member such as the rotatable crankshaft. Such a rotatable mass could obviously be some conventional part of the engine, such as the supercharger impeller of an aeronautical engine, the armature of an engine driven generator or some similar device. However, as the rotating elements would be constrained to rotate in an uneven manner so as to exchange energy with the crankshaft in an out of phase relation to the torsional vibration of the crankshaft this would necessitate the imposition of additional loads and stresses on the rotating element of the engine which might be undesirable. For this reason the disclosure of the invention illustrated incorporates, in each modification, an additional element which serves as the rotating mass component of the improved vibration damper.

In the modification shown in Fig. 1, the additional rotating member is in the form of a pair of double ring members one of which is generally indicated at 26. One ring 28 of each member surrounds a portion of the crankshaft journal 20 and may be supported thereon by means of an anti-friction bearing as indicated at 30 while the other ring 32, which has a predetermined weight, surrounds the respective end of the puck 22. These members supplement the weight of the counterweight and do not cause any unbalance of the crankshaft. The rings 32 are so positioned and dimensioned that when the puck moves in the recess 24 it causes the ring members 26 to oscillate about the bearings 20 so that the ring members add their moment of inertia to that of the weight 22 and change the period of the vibration damper. Thus, by the addition of suitable mass in the rotatable members as indicated at 26, the tuned frequency of the damper can be lowered to suppress any selected low order vibration.

In the modified form shown in Figs. 2 and 3, the additional rotating members 34 and 36 are in the form of substantially triangular, apertured, weights mounted on bearings, as indicated at 38, which roll on arcuate flanges 40 and 42, disposed along the outer edge of the counterweight and having their center of curvature coincident with the shaft axis 18. In this case the members 34 and 36 act as the rotating masses to which the counterweight is coupled by the centrifugal coupling comprising the puck 22 and the recess or aperture 24 and by the addition of these masses to the simple damper comprising the puck and the aperture the tuned frequency of the damper can be lowered to suppress a low order vibrational frequency of the crankshaft.

In the form shown in Fig 4 a pair of ring shaped members, one of which is indicated at 44, are mounted to roll on flanges 40 and 42, such as are shown in Figs. 2 and 3. Movements of the puck 22 in the aperture 24 cause the members 44 to roll along the respective flanges thereby adding the moment of inertia of the rings to that of the weights to reduce the tuned frequency of the damper and render the damper capable of suppressing a low order vibrational frequency.

Since the driven member, such as the elements 26 or 34 and 36 or 44, is mounted for rotation about a fixed axis its rotational speed does not affect the torque transmitted by the centrifugal coupling, which is dependent within the operative speed range on the speed of the driving member, but the driven member acts only to change the moment of inertia of the system. Since the rotational frequency of the system is proportional to the square root of the quotient of the torque divided by the moment of inertia, it is apparent that a change in the moment of inertia without a corresponding change in the transmitted torque will change the frequency and that an increase of the moment of inertia under such circumstances will lower the frequency of the system.

While three slightly different forms of mechanical arrangements have been shown for the purpose of disclosing the invention, it is to be understood that the invention is not limited to the particular arrangements so illustrated and described, but that such changes in the size, shape and arrangement of the various parts thereof may be resorted to as come within the scope of the appended claims.

Having now described the invention so that others skilled in the art may clearly understand the same, what it is desired to secure by Letters Patent is as follows:

1. An engine vibration damper comprising a rotatable driving member constituting an element of said engine, a driven member supported by said driving member for rotation relative to said driving member about the axis of said driving member, and a centrifugal coupling between said driving member and said driven member, said coupling and said driven member being proportioned to suppress a particular low order torsional vibration of said engine.

2. In combination with an engine having a crankshaft, means for suppressing torsional vibrations in said crankshaft comprising, a mass revolvable about the axis of said crankshaft and rotatable about its center of mass adjacent to said crankshaft, a centrifugal coupling between said mass and said crankshaft, and a support for said mass independent of said centrifugal coupling.

3. In combination with an engine having a crankshaft, means for suppressing torsional vibrations in said crankshaft comprising, a mass supported for rotation about the rotational axis of said crankshaft and for oscillation about an axis extending in the same direction as said crankshaft axis, and a centrifugal coupling between said mass and said crankshaft comprising, a member operatively connected to said crankshaft and said rotatable mass and rotatable with said crankshaft, said member acting under the influence of centrifugal force to resiliently maintain said crankshaft and said mass in a particular angular position relative to each other.

4. In combination with an engine having a crankshaft, means for suppressing low order torsional vibrations in said crankshaft comprising, a mass revolvable about the rotational axis of said crankshaft, a support for said mass constraining said mass to oscillatory movements about an axis extending in the same direction as said crankshaft axis, and a centrifugal coupling between said mass and said crankshaft and spaced from said support and said crankshaft axis, said coupling comprising a weight engaging in an aperture in an extended portion of said crankshaft and in an aperture in said rotatable mass.

5. In combination with an engine having a crankshaft, means for suppressing low order torsional vibrations in said crankshaft comprising, a plurality of members rotatable about the rotational axis of said crankshaft, a support for each member constraining said members to oscillatory movements about an axis extending in the same direction as said crankshaft axis, and centrifugal couplings between said members and said crankshaft spaced from the respective supports and from said crankshaft axis, each coupling comprising a weight engaging an aperture in an extended portion of said crankshaft and an aperture in a respective rotatable member.

6. In combination with an engine crankshaft having an apertured extension, a crankshaft vibration damper comprising, a member having a supporting bearing on said crankshaft concentric with the axis of rotation thereof and an aperture registering with the aperture in said crankshaft extension, and a cylindrical weight in said registering apertures having a diameter less than the diameter of said apertures.

7. In combination with an engine crankshaft having an apertured extension, a crankshaft vibration damper comprising, a member on each side of said extension each member having a supporting bearing on said crankshaft concentric with the axis of rotation thereof and an aperture registering with the aperture in said crankshaft extension, and a cylindrical weight in said registering apertures having a diameter less than the diameter of said apertures.

8. In combination with an engine crankshaft having an apertured extension, a member angularly movable relative to said crankshaft about an axis coincident with the axis of rotation of said crankshaft having an aperture registering with the aperture in said extension, and a cylindrical weight in said registering apertures having a diameter less than the diameter of said apertures.

9. In combination with an engine crankshaft having an apertured extension provided with a flanged track along the outer edge thereof curved on an arc centered on the axis of rotation of said crankshaft, an apertured member movable along said track in either direction from a position in which its aperture registers with and is concentric with the aperture in said extension, and a cylindrical weight in said apertures having a diameter less than the diameter of said apertures.

10. In combination with an engine crankshaft having an extension provided with an aperture in the outer portion thereof and a pair of flanged tracks along the outer edge thereof curved on an arc centered on the axis of rotation of said crankshaft, an apertured member movable along each track in each direction from a position in which its aperture registers with and is concentric with the aperture in said extension, and a cylindrical weight in said apertures having a diameter less than the diameter of said apertures.

11. In combination with an engine crankshaft having an apertured extension provided with flanged tracks along the outer edge thereof curved on an arc centered on the axis of rotation of said crankshaft, apertured members freely movable along said track in each direction from a position in which their apertures register with and are concentric with the aperture in said extension, a cylindrical weight in said apertures having a diameter less than the diameter of said apertures, and an anti-friction bearing between said movable member and said supporting track.

12. In combination with an engine crankshaft having an apertured extension provided along its outer edge with a flanged track curved on an arc centered on the axis of rotation of said crankshaft, an apertured ring shaped member adapted to roll along said track in each direction from a position in which its aperture registers with and is concentric with the aperture in said extension, and a cylindrical weight in said apertures having a diameter less than the diameter of said apertures.

GEORGE L. WILLIAMS.